US008433285B2

(12) United States Patent
Cao

(10) Patent No.: US 8,433,285 B2
(45) Date of Patent: Apr. 30, 2013

(54) METHOD AND DEVICE FOR INCREASING COMPLEXITY OF PASSWORD OF COMMUNICATION TERMINAL BY SETTING CHARACTER PASSWORD THROUGH PICTURES

(75) Inventor: Can Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/515,651

(22) PCT Filed: Sep. 13, 2010

(86) PCT No.: PCT/CN2010/076832
§ 371 (c)(1),
(2), (4) Date: Jun. 13, 2012

(87) PCT Pub. No.: WO2011/124057
PCT Pub. Date: Oct. 13, 2011

(65) Prior Publication Data
US 2012/0252409 A1     Oct. 4, 2012

(30) Foreign Application Priority Data
Apr. 9, 2010    (CN) .......................... 2010 1 0143089

(51) Int. Cl.
*H04M 1/68* (2006.01)

(52) U.S. Cl.
USPC ..... 455/410; 455/414.1; 455/418; 455/550.1; 455/566; 455/566.2; 713/183; 713/184; 713/186; 726/4; 726/5; 726/28; 726/30

(58) Field of Classification Search .............. 455/410, 455/414.1, 414.4, 550.1, 556.2, 418–420, 455/566; 713/183–186; 726/2–5, 26–30; 715/702–708; 705/44
See application file for complete search history.

(56) References Cited

U.S. PATENT DOCUMENTS

| 5,559,961 | A  | * | 9/1996 | Blonder ......................... 726/18 |
| 7,272,380 | B2 | * | 9/2007 | Lee et al. ...................... 455/410 |
| 2006/0089792 | A1 | * | 4/2006 | Manber et al. ................ 701/207 |
| 2007/0198286 | A1 | * | 8/2007 | Tomita ............................. 705/1 |
| 2010/0037306 | A1 | * | 2/2010 | Jan .................................. 726/7 |
| 2010/0121737 | A1 | * | 5/2010 | Yoshida ......................... 705/27 |
| 2011/0016520 | A1 | * | 1/2011 | Cohen et al. .................. 726/19 |

FOREIGN PATENT DOCUMENTS

| CN | 101464741 | 6/2009 |
| CN | 101627393 | 1/2010 |
| CN | 101645121 | 2/2010 |
| CN | 101827360 | 9/2010 |

* cited by examiner

*Primary Examiner* — Vladimir Magloire
*Assistant Examiner* — Babar Sarwar
(74) *Attorney, Agent, or Firm* — Pearl Cohen Zedek Latzer, LLP

(57) ABSTRACT

A method and apparatus for setting a graph password of a communication terminal are disclosed to solve the problem that the security of the traditional character password is lower. The method includes the following steps: in a case when a setting graph password instruction of a user is received and it is judged that no character password is set before, generating a graph interface with a plurality of loaded pictures, wherein, each loaded picture is randomly filled in a corresponding grid of a two-dimensional lattice of the graph interface; obtaining a picture identification (ID) and a coordinate value for setting a graph password by selecting at least one loaded picture in the graph interface as the picture corresponding to the graph password; converting the picture ID and the coordinate value for setting the graph password into a character password and storing the character password, finishing setting the graph password.

8 Claims, 4 Drawing Sheets

… (1)

METHOD AND DEVICE FOR INCREASING COMPLEXITY OF PASSWORD OF COMMUNICATION TERMINAL BY SETTING CHARACTER PASSWORD THROUGH PICTURES

CROSS-REFERENCE TO RELATED APPLICATIONS

This application is a National Phase Application of PCT International Application No. PCT/CN2010/076832, entitled "METHOD AND DEVICE FOR SETTING GRAPH PASSWORD OF COMMUNICATION TERMINAL", International Filing Date Sep. 13, 2010, published on Oct. 13, 2011 as International Publication No. WO 2011/124057, which in turn claims priority from Chinese Patent Application No. 201010143089.9, filed Apr. 9, 2010, both of which are incorporated herein by reference in their entirety.

TECHNICAL FIELD

The present invention relates to a password application technology of a communication terminal, and in particular, to a method and apparatus for setting a graph password of a communication terminal.

BACKGROUND OF THE RELATED ART

At present, the password application system applied in the communication terminal, such as a mobile phone, mainly relates to, for example, the pin password or password set with the mobile phone. And the traditional character type password used as an important means has the security problem itself, for example, it is very easy to be cracked since there are only 94 traditional characters. Once the character type password is cracked, it will cause very severe security problem to the user.

SUMMARY OF THE INVENTION

The objective of the present invention is to provide a method and apparatus for setting a graph password of a communication terminal, which can solve the problem that the security of the traditional character password is lower.

The method for setting a graph password of a communication terminal provided by the present invention comprises the following steps:

in a case when a setting graph password instruction of a user is received and no character password is set before, generating a graph interface with a plurality of loaded pictures, wherein, each loaded picture is randomly filled in a corresponding grid of a two-dimensional lattice of the graph interface; wherein, there are a plurality of grids on the two-dimensional lattice, and each grid thereof has a unique coordinate value;

selecting at least one loaded picture in the graph interface to set a graph password, obtaining a picture identification (ID) and a coordinate value;

according to a preset corresponding relationship between picture IDs, coordinate values and characters, converting the picture ID and the coordinate value for setting the graph password into a character password and storing the character password, finishing setting the graph password.

The apparatus for setting a graph password of a communication terminal provided by the present invention comprises:

a setting graph password unit, configured to receive a setting graph password instruction input by a user and trigger a graph coordinate conversion unit;

a graph password interface generating unit, configured to generate a graph interface with a plurality of loaded pictures, wherein, each loaded picture thereof is randomly filled in one grid of a two-dimensional lattice of the graph interface;

a graph password input unit, configured to receive a loaded picture selected from the graph interface by a user, and obtain a picture identification (ID) and a coordinate value for setting the graph password by using the selected loaded picture as the picture corresponding to the graph password;

the graph coordinate conversion unit, configured to convert the picture ID and the coordinate value for setting the graph password obtained by the graph password input unit into a character password and store the character password.

Compared to the related art, since the picture ID and the coordinate value of the grid where the picture is located are used as the password in the present invention, the complexity of the password is increased. That is to say, since the graph password includes the ID of the password picture and the coordinate value of the picture position, it is impossible to pass the password authentication if only the picture for the graph password is known, thus increasing the security of the use of the password.

On the other hand, since the picture quantity of the graph password can be very large, and there can be more grids such as 3*3 grids, in the two-dimensional lattice graph interface, there could be an enormous amount of passwords formed by the picture ID plus the coordinate value of the invention, which increases the difficulty of decoding the password, thus further increasing the security of using the password.

PREFERRED EMBODIMENTS OF THE PRESENT INVENTION

A method and apparatus for setting a graph password of a communication terminal of the present invention is described in detail in combination with the accompanying drawings hereinafter.

Figure 1:
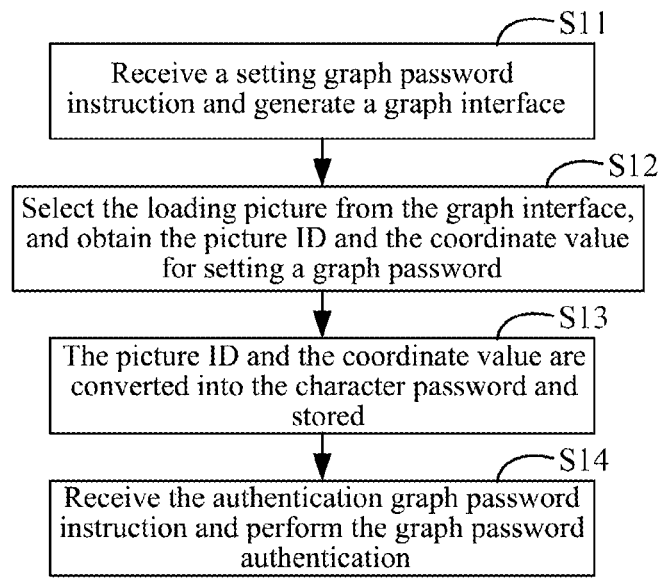
FIG. 1 is a chart flow of a method for applying a graph password of a communication terminal of the present invention.

FIG. 1 shows a flow chart of a method for setting a graph password of a communication terminal according to a first embodiment. As shown in FIG. 1, the application method includes the following steps.

In step S11, when a setting graph password instruction of a user is received and it is judged that no character password is set before, a graph password interface generating unit (referring to FIG. 4) randomly generates a graph interface with a plurality of loaded pictures, and its each loaded picture is randomly filled in a corresponding grid of a two-dimensional lattice of the a plurality of graph interfaces.

Specifically, the two-dimensional lattice of the graph interface is divided into a plurality of grids, for example, being divided into 3*3, 4*4 . . . grids, and each grid has one unique coordinate, so that each loaded picture filled in the grid can be given the coordinate of that grid. Generally speaking, the quantity of the loaded pictures generated by the graph password generating unit each time is the same as the quantity of the grids, and all loaded pictures are filled into corresponding grids one by one randomly. Wherein, the graph interface is not merely limited to the above-mentioned two-dimensional lattice graph interface.

In step S12, the loaded picture used for setting the graph password is selected from the graph interface, and the picture identification (ID) and the coordinate value for setting the graph password are obtained.

In step S13, the obtained picture ID and the coordinate value for setting the graph password are converted into character data according to the preset corresponding relationship between picture IDs, coordinate values and characters, and the character data are stored, thus finishing setting the graph password.

In step S14, hereafter, after the instruction from the user to authenticate the set graph password, the authorization to the graph password is started, thereby finishing the application of the graph password.

Figure 2:
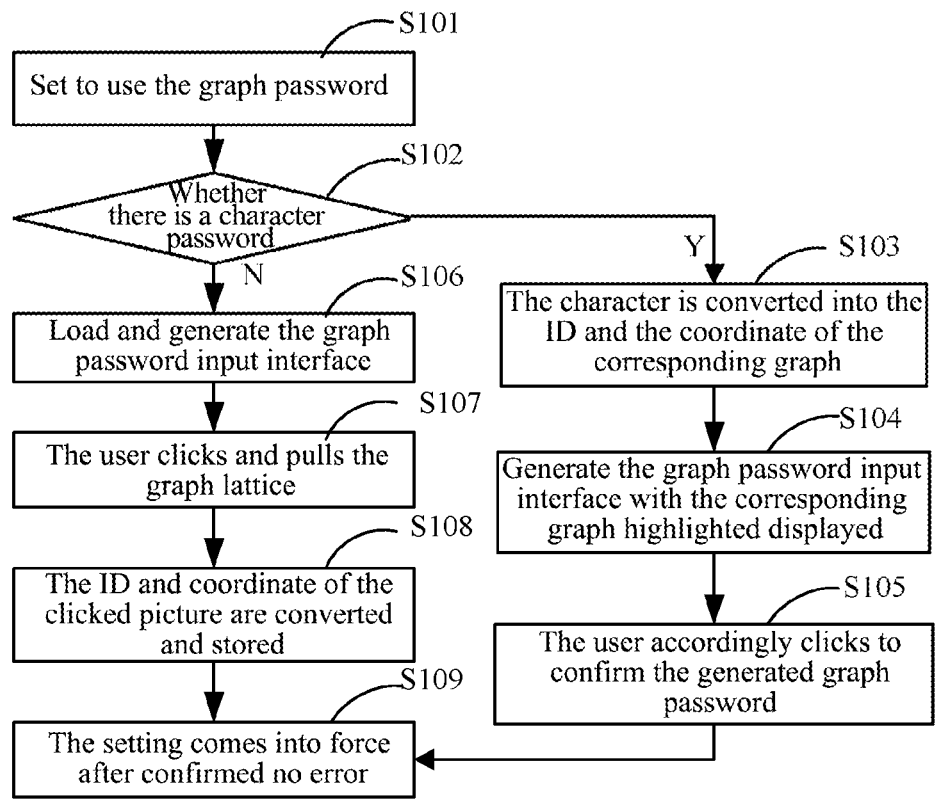
FIG. 2 is a chart flow of a method for setting a graph password of a communication terminal of the present invention.

FIG. 2 shows a flow chart of a method setting a graph password of a communication terminal according to a second embodiment. As shown in the figure, the method includes the following steps.

In step S101, according to the setting graph password instruction of the user, it starts the operation to set the graph password.

In step S102, it is judged whether the character password is already set before, and if yes, then step S103 is executed, otherwise, step S106 is executed.

In step S103, according to the preset corresponding relation between the picture ID, coordinate value and the character, the character password is converted into the picture ID and the coordinate value, and then step S104 is executed.

In step S104, according to the picture ID and the coordinate value obtained in step S103, the loaded picture with that picture ID is filled into the grid with that coordinate value, and thus the password input interface of the loaded picture corresponding to the character password is generated. Wherein, the loaded picture is highlighted displayed to prompt the user to pay attention, and step S105 is executed hereafter.

In step S105, the highlighted displayed loaded picture is selected (such as clicking or pulling) from the password input interface to confirm the graph password, and the picture ID and the coordinate value for setting the graph password are obtained, and step S109 is executed.

In step S106, in a case when the user does not set the character password, a group of pictures are loaded randomly, and the group of loaded pictures are randomly distributed to the corresponding grids of the two-dimensional lattice, and the graph interface with a plurality of loaded pictures respectively filled in a plurality of two-dimensional lattices is generated, and step S107 is executed.

In step S107, the user selects the loaded picture from the graph interface, and obtains the picture ID and the coordinate value used for setting the graph password, and step S108 is executed.

In step S108, according to the preset corresponding relation of the picture ID and coordinate value and the character, the picture ID and coordinate value for setting the graph password are converted into the character data and stored, and step S109 is executed.

In step S109, the user confirms the set graph password again, and the graph password setting, after being confirmed with no error, comes into force, and the user quits.

Wherein, the number of times of the user clicking pictures for selecting the loaded picture from the graph interface in the process of setting the graph password can be set differently according to the actual application requirement of the user.

Figure 3:
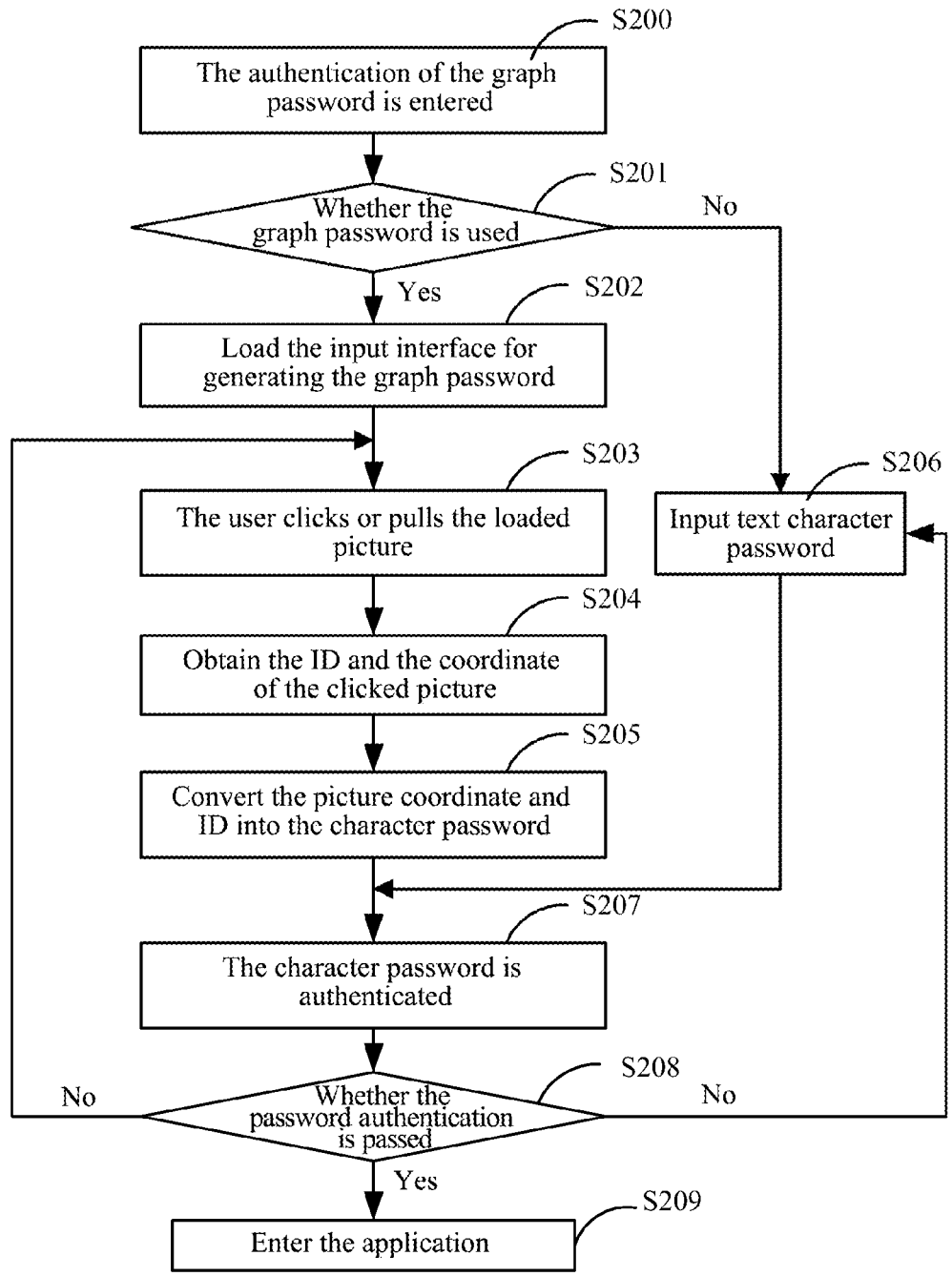
FIG. 3 is a chart flow of authenticating a graph password of a communication terminal of the present invention.

As shown in FIG. 3, the authentication flow of a graph password of a communication terminal is as follows.

In step S200, the communication terminal receives the instruction for authorizing the graph password from the user, and enters the authentication process of the graph password.

In step S201, it is judged whether the graph password has already been set, if yes, then step S202 is executed, otherwise step S206 is executed.

In step S202, the graph interface with a plurality of loaded pictures respectively filled in a plurality of two-dimensional lattices is generated, wherein, according to the picture ID and the coordinate value for setting the graph password obtained through converting the character data for setting the graph password, the picture selected when setting the graph password is loaded to the grid corresponding to the coordinate value.

In step S203, the user clicks or pulls the loaded picture from the graph interface.

In step S204, the picture ID and the coordinate value for authenticating the graph password are obtained.

In step S205, the picture ID and the coordinate value for authenticating the graph password are converted into the character password, and then step S207 is executed.

In step S206, the input of the text character password of the user is received, and then step S207 is executed.

In step S207, the character password is authorized. Specifically, the character data for authenticating obtained through the conversion or the character data obtained according to the input of the user are compared with the character data for setting the graph password or the character data from the user to set the character password.

In step S208, after comparing, it is judged whether the password authentication is successful, and if the two match, then the authentication is successful, and step S209 is executed and it enters the specific application; otherwise, it is returned back to step S203 or step S209 according to the service condition of the password, and the number of surplus times for password input is prompted.

Figure 4:
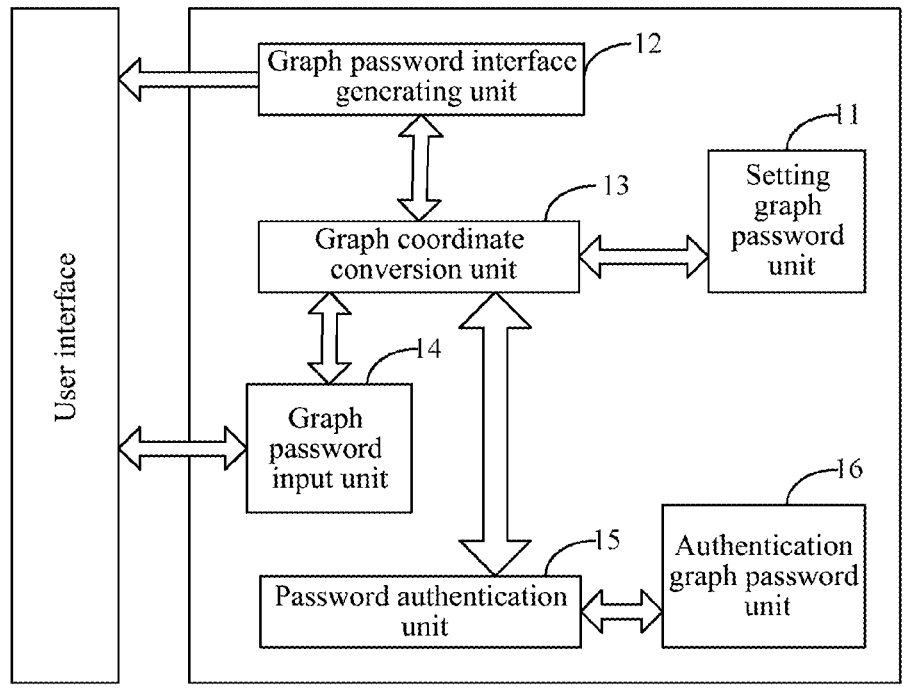
FIG. 4 is a structure diagram of an apparatus for applying a graph password of a communication terminal of the present invention.

FIG. 4 shows the structure of the application apparatus of the graph password of the communication terminal, including: a setting graph password unit 11; a graph coordinate conversion unit 13 of a connection unit 11; a graph password interface generating unit 12 of the connection unit 13; and a graph password input unit 14 connected to the user interface and the unit 13 respectively. In addition, it further includes an authentication graph password unit 16; and a password authentication unit 15 connected to the connection unit 13 and the unit 16.

The setting graph password unit 11 receives the setting graph password instruction input by the user, and in the case when it is judged that the character password is not set before, triggers the graph coordinate conversion unit 13 to establish and record the corresponding relation of the picture ID of the graph interface of the graph password and the lattice coordinate value. The graph coordinate conversion unit 13 transmits the corresponding relation between the picture ID and the lattice coordinate value to the graph password interface generating unit 12. The graph password interface generating unit 12 draws out one fixed 3*3 grid at first, and then loads the picture from the fixed picture resource packet according to the received corresponding relation between the received picture ID and the lattice coordinate value to fill into the lattice, and generates a graph interface with a plurality of loaded pictures filled respectively in a plurality of two-dimensional lattices.

The user selects the loaded picture from the graph interface, the graph password input unit 14 obtains the picture ID and the coordinate value for setting the graph password through the loaded picture selected by the user, wherein, the specific process of obtaining the picture ID and the coordinate value for setting the graph password is that: first of all, the graph password input unit 14 judges whether the received user selection is a clicking or pulling event; if it is a pure clicking event, obtaining the coordinate value of the clicked lattice; if it is pulling and touching, then it needs to judge the coordinate value of the lattice in the starting point, calculate how many graph lattices are passed, and interact with the user interface; secondly, the ID numbers of the clicked graphs are obtained according to the corresponding relation of the picture ID of the graph interface of the graph password and the lattice coordinate value recorded by the graph coordinate conversation unit 13, and are then transmitted to the graph coordinate conversation unit 13.

In addition, when the setting graph password unit 11 receives the setting graph password instruction input by the user and in the case when it is judged that the character password is set before, the graph password interface generating unit 12, according to loaded picture ID and the coordinate value of the lattice where the load picture is located from the graph coordinate conversion unit 13 converting the preset character password, loads the picture corresponding to the loaded picture ID to the lattice where the load picture is located, and generates the graph interface with a plurality of loaded pictures filled in a plurality of two-dimensional lattices respectively, wherein, the picture corresponding to the loaded picture ID is highlighted displayed, the graph password input unit 14 receives the loaded picture, which is highlighted displayed, selected from the graph interface by the user, and obtains the picture ID and the coordinate value for setting the graph password.

The graph coordinate conversation unit 13 converts the picture ID and the coordinate value for setting the graph password obtained by the graph password input unit 14 into the character data and stores, and finishes setting the graph password.

When the authentication graph password unit 16 receives the authentication graph password instruction input by the user, the password authentication unit 15 is triggered to perform the authentication operation of the graph password, and the password authentication unit 15 triggers the graph coordinate conversation unit 13 to convert the character data stored when setting the graph password into the picture ID and the coordinate value of the picture selected for setting the graph password, and transfers to the graph password interface generating unit 12. The graph password interface generating unit 12 further loads the picture selected when setting the graph password into the lattice corresponding to the coordinate value, and generates the graph interface with a plurality of loaded pictures filled in a plurality of two-dimensional lattices respectively. The graph password input unit 14 receives the loaded picture for authentication selected through the graph interface, obtains the picture ID and the coordinate value for authenticating the graph password, and transmits to the graph coordinate conversion unit 13; the graph coordinate conversion unit 13 converts the picture ID and the coordinate value to the character data for authentication, and transmits to the password authentication unit 15; the password authentication unit 15 compares the character data for authentication with the character data for setting the graph password; if they are matched, then the authentication is successful and the next interface is entered; if they are not matched, then the authentication fails, it returns to notify the graph password input unit 14 to input the graph password again, and prompts the number of surplus times for password input.

Figure 5:
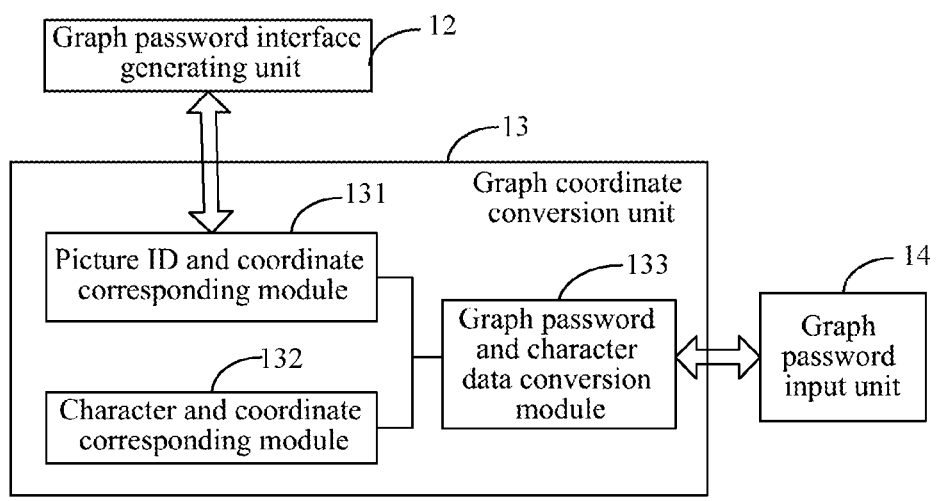
FIG. 5 is a structure diagram of a graph coordinate conversion unit in FIG. 4.

FIG. 5 shows the specific structure of the graph coordinate conversion unit according to an embodiment of the present invention.

The picture ID and coordinate corresponding module 131 establishes and records the corresponding relation of the picture ID of the graph interface of the graph password and the lattice coordinate value, and provides the corresponding relation to the graph password interface generating unit 12 to generate the graph interface with a plurality of loaded pictures filled in a plurality of two-dimensional lattices respectively.

The character and coordinate corresponding module 132 records the corresponding relation of the character and the lattice coordinate value.

The graph password and character data conversion module 133 performs conversion between the graph password and the character password according to the picture ID, the coordinate corresponding module 131 and the character and coordinate corresponding module 132.

The graph password input unit 14 receives the loaded picture selected by the user through the graph interface, obtains the loaded picture ID and the coordinate value of the loaded picture and transmit to the graph password and character data conversion module 133; the graph password and character data conversion module 133 converts the loaded picture ID and the coordinate value to the character data and stores according to the corresponding relation of the picture ID and the lattice coordinate value stored by the picture ID and coordinate corresponding module 131 and the corresponding relation of the character and the lattice coordinate value recorded by the character and coordinate corresponding module 132.

In addition, in the case when it is judged that a character password is set before, the graph password and character data conversion module 133 converts the character password stored before into the coordinate value of the located lattice according to the character and coordinate corresponding module 132 at first, and then corresponds the coordinate of the located lattice to the picture ID according to the picture ID and coordinate corresponding module 131, transmits to the graph password interface generating unit, and generates the graph interface with a plurality of loaded pictures filled in a plurality of two-dimensional lattices respectively, wherein, the picture obtained from the conversion of the character password is highlighted displayed in the position of its corresponding lattice.

Figure 6:
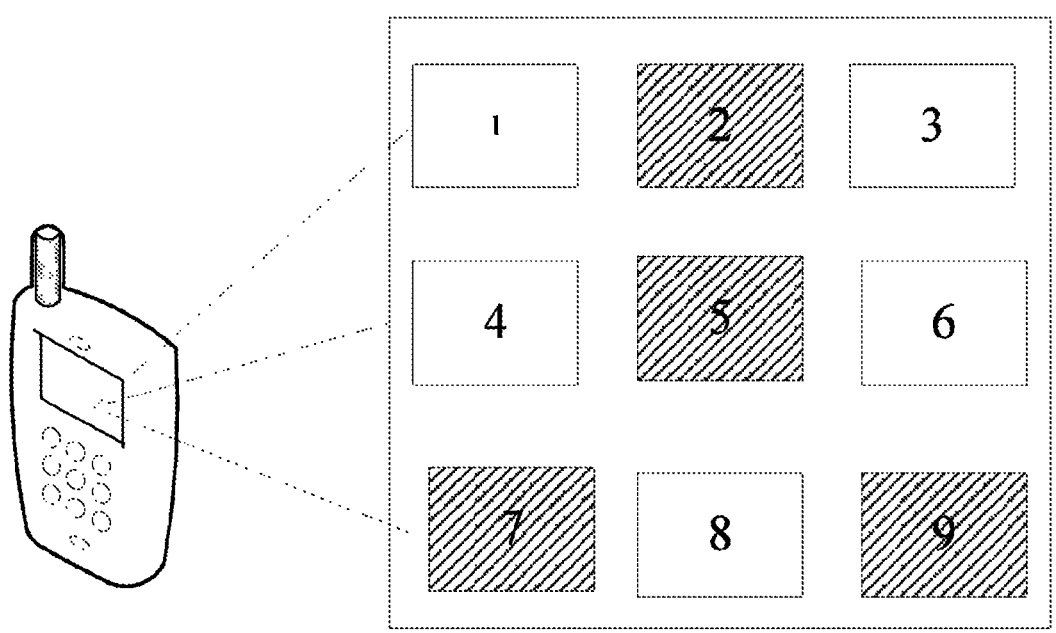
FIG. 6 is an application example of a graph password in the invention.

FIG. 6 is an application example of the graph password of the invention, wherein, the picture is displayed by the 3*3 lattice, every lattice is used for displaying one picture, and every lattice corresponds to one coordinate position. The figure shows one 3*3 lattice that is used for setting and inputting the graph password, and 9 lattices corresponds to 9 pictures. It is assumed that the picture IDs are numbers from 1 to 9, and the corresponding coordinate value of each picture is calculated regarding the picture of upper left corner of the lattice as the (0, 0) point of X, Y coordinate system, and the coordinates of the picture 1 to 9 corresponds to (0, 0), (0, 1), (0, 2), (1, 0), (1, 1), (1, 2), (2, 0), (2, 1), (2, 2) respectively. So the password can be formed by using the ID and corresponding X, Y coordinate value of each picture to perform the password and store.

As shown in the picture, the rectangle with shade is the graph password selected by the user, that is, the corresponding 4 picture IDs are 2, 5, 7 and 9. Then it can combine the coordinates and IDs of the 4 pictures into a certain specific data structure to store. For example, the picture 2 is corresponding to (0, 1, 2), indicating that the coordinate is (0, 1), and the picture ID is 2. Since the quantity of pictures for the graph password can be very large, and there can be more grids in the two-dimensional lattice graph interface, the graph passwords of the picture ID plus the coordinate value of the present invention can form the large amount of passwords, which increases the difficulty of cracking the password, thereby further increasing the security of using the password.

The application method of the graph password of the communication terminal provided in the present invention, which is different from the simple text or character password verification, realizes more abundant user interface interaction, strengthens the security of authentication, improves the reliability of the system, simultaneously realizes the inter-conversion between the character password and the graph password through the graph coordinate conversion unit, and promotes the user experience. In addition, the function of the graph coordinate conversion unit is not limited to the graph interface of the two-dimensional lattice after designing expansion, so it can make the form of the user interface more flexible and more diversified, which greatly increases the interest during using.

The above description is the preferable embodiments of the present invention. It should be pointed out, for those skilled in the art, a plurality of modifications and retouches also can be made without departing from the described principles of the present invention, and all the modifications and retouches should be embodied in the scope of the present invention.

I claim:

1. A method for setting a graph password of a communication terminal, comprising the following steps:
   in a case when a setting graph password instruction of a user is received and no character password is set before, generating a graph interface with a plurality of loaded pictures, wherein, each loaded picture is randomly filled in a corresponding grid of a two-dimensional lattice of the graph interface;
   obtaining a picture identification (ID) and a coordinate value for setting a graph password by selecting at least one loaded picture in the graph interface as the picture corresponding to the graph password; according to a preset corresponding relationship between picture IDs, coordinate values and characters, converting the picture ID and the coordinate value for setting the graph password into a character password and storing the character password, finishing setting the graph password;
   in the case when the setting graph password instruction of the user is received and it is judged that the character password is set before, converting the character password set before into the ID of the loaded picture displayed in the graph interface and the coordinate value of the grid where the loaded picture is located in the lattice by utilizing the preset corresponding relationship between picture IDs, coordinate values and characters, and then obtaining the picture ID and the coordinate value for setting the graph password by selecting a displayed loaded picture from the graph interface by the user.

2. The method according to claim 1, wherein, there are a plurality of grids on the two-dimensional lattice, and each grid thereof has a unique coordinate value.

3. The method according to claim 2, wherein, the loaded picture is selected from the graph interface by clicking the loaded picture in the graph interface, wherein, the coordinate value of the picture for setting the graph password which is obtained by clicking the loaded picture is the coordinate value of the clicked lattice.

4. The method according to claim 1, wherein, there are a plurality of grids on the two-dimensional lattice, and each grid thereof has a unique coordinate value.

5. The method according to claim 1, wherein, the loaded picture is selected from the graph interface by clicking the loaded picture in the graph interface, wherein, the coordinate value of the picture for setting the graph password which is obtained by clicking the loaded picture is the coordinate value of the clicked lattice.

6. An apparatus for setting a graph password of a communication terminal, comprising:
   a setting graph password unit, configured to receive a setting graph password instruction input by a user and trigger a graph coordinate conversion unit;
   a graph password interface generating unit, configured to generate a graph interface with a plurality of loaded pictures, wherein, each loaded picture thereof is randomly filled in one grid of a two-dimensional lattice of the graph interface;
   a graph password input unit, configured to receive a loaded picture selected from the graph interface by a user, and obtain a picture identification (ID) and a coordinate value for setting the graph password by using the selected loaded picture as the picture corresponding to the graph password;
   the graph coordinate conversion unit, configured to convert the picture ID and the coordinate value for setting the graph password obtained by the graph password input unit into a character password and store the character password.

7. The apparatus according to claim 6, wherein, the graph coordinate conversion unit further comprises:
   a picture ID and coordinate corresponding module, configured to establish and record a corresponding relation between picture IDs of the graph interface of the graph password and coordinate values of grids in a lattice;
   a character password coordinate corresponding module, configured to record a corresponding relation between characters and coordinate values of grids in the lattice;
   a graph password and character data conversion module, configured to, according to the corresponding relation between picture IDs and coordinate values of grids stored in the picture ID and coordinate corresponding module and the corresponding relation between characters and coordinate values of grids stored in the character password coordinate corresponding module, convert a picture ID and coordinate value into a corresponding character password, and convert a character password into a corresponding picture ID and coordinate value.

8. The apparatus according to claim 6, wherein, the graph password interface generating unit connects the graph coordinate conversion unit, and is configured to, according to the picture ID and the coordinate value obtained after conversion by the graph coordinate conversion unit, display the loaded picture corresponding to the picture ID and the coordinate value on the corresponding grid of the graph interface.

* * * * *